United States Patent [19]

Strassheimer et al.

[11] 4,143,974

[45] Mar. 13, 1979

[54] APPARATUS FOR PLASTICIZING GRANULAR SYNTHETIC PLASTIC MATERIALS

[75] Inventors: Herbert Strassheimer, Wehrheim; Florian Übelacker, Altenstadt, both of Fed. Rep. of Germany

[73] Assignee: GKN Windsor GmbH, Fed. Rep. of Germany

[21] Appl. No.: 876,350

[22] Filed: Feb. 9, 1978

Related U.S. Application Data

[63] Continuation of Ser. No. 760,101, Jan. 17, 1977, abandoned.

[30] Foreign Application Priority Data

Jan. 22, 1976 [DE] Fed. Rep. of Germany ....... 2602204

[51] Int. Cl.² ............................................ B29B 1/06
[52] U.S. Cl. .................................... 366/78; 366/89; 366/99
[58] Field of Search ........................ 366/78, 79, 89, 97, 366/98, 99, 323, 322, 318; 425/205, 207, 208, 209

[56] References Cited

U.S. PATENT DOCUMENTS

| 2,970,341 | 2/1961 | Mallory | 425/380 |
|---|---|---|---|
| 3,263,276 | 8/1966 | Maier | 425/208 |
| 3,344,215 | 9/1967 | Dewitz et al. | 425/209 |
| 3,431,599 | 3/1969 | Fogelberg | 366/79 |
| 3,669,416 | 6/1972 | Sutter | 366/78 |
| 3,737,151 | 6/1973 | Schaeffer et al. | 366/79 |
| 3,826,477 | 7/1974 | Kunogi et al. | 366/79 |

FOREIGN PATENT DOCUMENTS 672080 3/1966 Belgium ................................. 366/79

*Primary Examiner*—Robert W. Jenkins
*Attorney, Agent, or Firm*—Peter K. Kontler

[57] ABSTRACT

A plasticizing and melting apparatus for granular synthetic plastic material has a heatable cylinder one end of which has an inlet opening for reception of granular material from an adjustable feeding unit which includes a shaker. The cylinder surrounds a rotary feed screw having a material advancing section in the region of the inlet opening, a first material densifying section immediately downstream of the advancing section, a collar which defines with the cylinder a narrow annular shearing gap immediately downstream of the first densifying section, a pressure relaxing section immediately downstream of the collar, and a second densifying section immediately downstream of the pressure relaxing section. The cylinder has one or more gas evacuating apertures which connect the interior of the cylinder with the atmosphere in the region surrounding the pressure relaxing section. The feed screw is movable axially between front and rear end positions, and the aperture or apertures are disposed in the region of the rear third of the pressure relaxing section when the feed screw assumes its front end position. This, combined with the feature that the length of the pressure relaxing section exceeds the distance between the two end positions of the feed screw, insures that the aperture or apertures can remove, from the area surrounding the pressure relaxing section, water vapors and/or other volatile constituents which are liberated in the interior of the cylinder as a result of plasticizing and melting of the plastic material.

3 Claims, 2 Drawing Figures

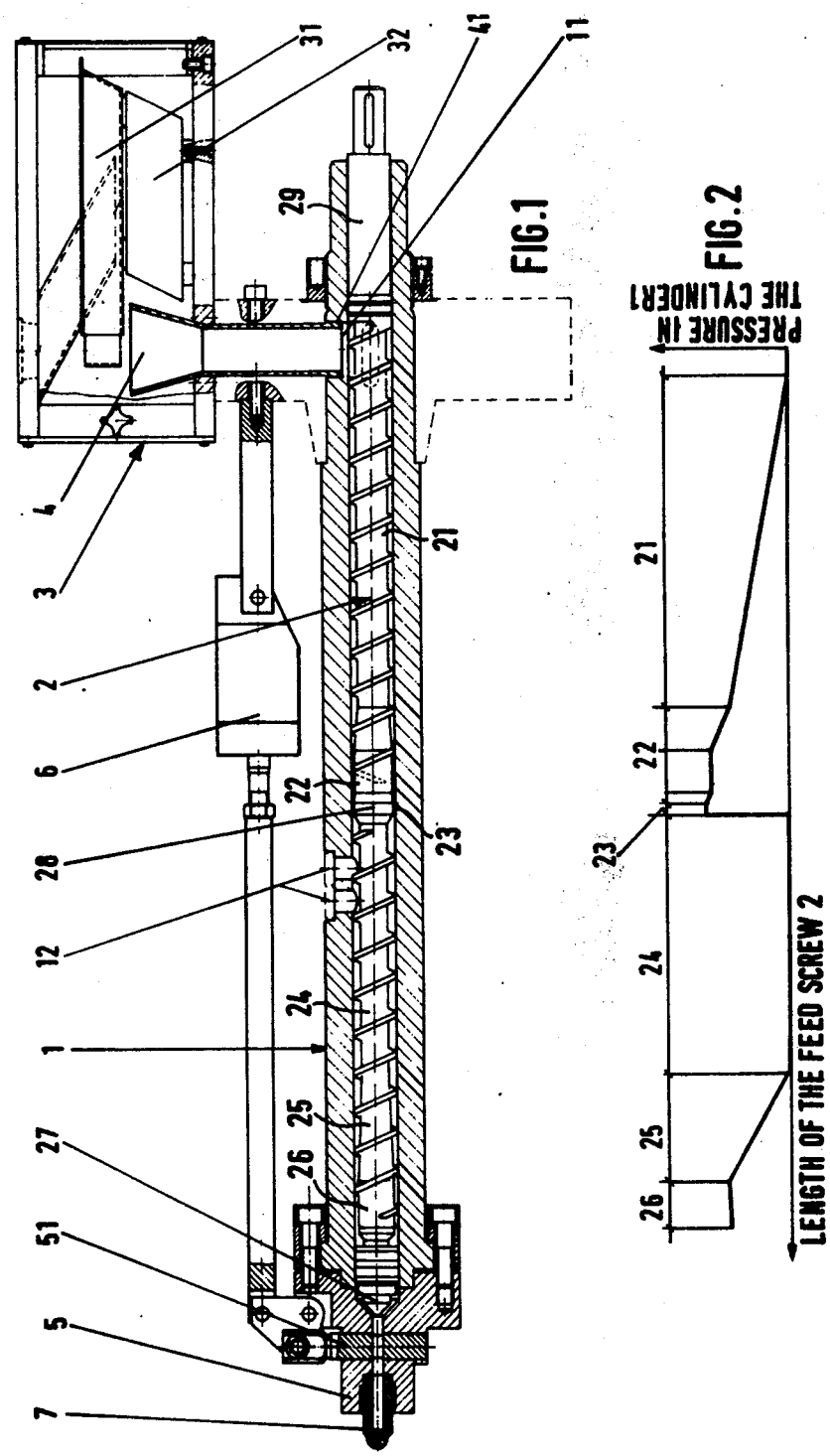

APPARATUS FOR PLASTICIZING GRANULAR SYNTHETIC PLASTIC MATERIALS

This is a continuation of application Ser. No. 760,101, filed Jan. 17, 1977, now abandoned.

BACKGROUND OF THE INVENTION

The present invention relates to apparatus for the plasticizing and melting of synthetic plastic materials, especially granulae, wherein the plasticizing and melting operations take place in the interior of a heated cylinder or barrel for an elongated rotary and reciprocable feed screw. Such apparatus may be used for injection of plastic material into the mold or molds of an injection molding machine.

Apparatus for plasticizing and melting of granular synthetic plastic materials include a feeding unit which admits granulae to one end of the plasticizing cylinder whereby the material undergoes compression, heating and plasticizing as a result of rotation of the feed screw as well as owing to heating of the cylinder. The conversion of granular starting material into a mass which is ready to be converted into injection molded products is accompanied by release of volatile constituents which must be segregated from the plasticized material before the latter issues from the nozzle or die at the forward or discharge end of the cylinder. The development of water vapors in the plasticizing cylinder can be prevented, or its extent reduced, by drying the granular material prior to introduction into the apparatus. A drawback of drying prior to admission into the cylinder is that the initial and maintenance cost of drying equipment is quite high. Moreover, the operation of such equipment must be monitored and regulated with a high degree of accuracy because, if not properly conditioned, the stream or streams of gaseous fluid (normally air) which are utilized for drying of granular material prior to admission into the plasticizing cylinder are likely to cause baking and conversion of granulae into clumps or similar agglomerations.

It is already known to provide the plasticizing cylinder with an aperture which permits the escape of volatile constitutents from the plasticized synthetic plastic material while such material advances toward the nozzle or die at the forward end of the cylinder. It is also known to place such aperture downstream of a shearing collar on the feed screw, and more particularly in communication with that portion of the interior of the cylinder wherein the plastic material is subjected to relatively low compressive stresses. The aperture extends upwardly from the interior of the cylinder, and the pressure of confined plastic material is regulated by axial shifting of the feed screw in such a way that the material does not tend to escape from the cylinder by way of the aperture. Such regulation is not possible in apparatus wherein the feed screw moves axially and rearwardly during each working cycle, i.e., wherein the feed screw moves axially for a purpose other than to regulate the pressure of confined material.

It is further known to allow for escape of gases from the plasticizing cylinder in the region where the granular material enters the cylinder. To this end, the material admitting or feeding unit is adjustable radially of the feed screw and its outlet portion defines with the inlet opening of the cylinder a gap for escape of gases. The means for adjustably mounting the feeding unit is complex because it should not prevent the feeding unit form admitting the material at a predictable rate and in such a way that the grooves between the threads of the feed screw are filled with material but the material does not pile up on top of the threads.

OBJECTS AND SUMMARY OF THE INVENTION

An object of the invention is to provide an apparatus which can properly plasticize and melt granular synthetic plastic materials without any drying of granulae prior to introduction into the cylinder.

Another object of the invention is to provide an apparatus of the just outlined character which can reliably evacuate, without resorting to vacuum, volatile constituents that are liberated during conversion of granular synthetic plastic material into a plasticized mass.

A further object of the invention is to provide a novel and improved feed screw for use in the plasticizing cylinder of the above outlined apparatus.

An additional object of the invention is to provide an apparatus wherein the feeding unit need not be adjustable relative to the plasticizing cylinder.

An ancillary object of the invention is to provide a novel and improved plasticizing cylinder for use in an apparatus of the above outlined type.

A further object of the invention is to provide an apparatus whose output is just as high as but whose dimensions (particularly its length) are substantially less than those of conventional apparatus.

An additional object of the invention is to provide an apparatus wherein volatile constituents which are liberated during plasticizing of granular synthetic plastic materials can escape without resorting to vacuum, without resorting to complex and expensive auxiliary equipment and in spite of the fact that the feed screw moves axially during conversion of granulae into a flowable mass and/or during expulsion of such mass from the cylinder.

The invention is embodied in an apparatus for the plasticizing and melting of synthetic plastic materials, particularly granular materials which, when plasticized, are introduced into the mold or molds of an injection molding machine. The apparatus comprises a heatable elongated and preferably horizontal cylinder or barrel having an intake end provided with an inlet opening, a discharge end and at least one gas-discharging aperture intermediate the inlet opening and the discharge end, adjustable feeding means which preferably includes a shaker or analogous agitating means and is arranged to deliver metered quantities of granular material into the cylinder by way of the inlet opening, and a feed screw which is rotatably mounted in the cylinder. The feed screw comprises a material advancing section in the region of the inlet opening, a first material densifying section between the advancing section and the aperture, a pressure relaxing section in the region of the aperture, a second material densifying section between the pressure relaxing section and the discharge end, and a collar which is free of threads and is disposed between the first densifying section and the pressure relaxing section to define with the internal surface of the cylinder a relatively narrow annular shearing gap through which densified material passes from the cylinder portion surrounding the first densifying section into the cylinder portion which surrounds the pressure relaxing section. The feed screw is movable axially of the cylinder between front and rear end positions and the aperture is provided in that portion of the cylinder which surrounds the rear third of the pressure relaxing section in the front end position of the feed screw.

The feed screw includes a first helical thread which forms part of the advancing section and a second helical thread which forms part of the pressure relaxing section. The depth of the groove which is defined by the second thread exceeds (preferably by up to 20 percent) the depth of the groove which is defined by the first thread.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a schematic axial sectional view of an apparatus which embodies the invention; and FIG. 2 is a diagram showing the manner in which the pressure of plastic material varies during travel through the cylinder of the apparatus of FIG. 1.

DESCRIPTION OF THE PREFERRED EMBODIMENTS

The apparatus of FIG. 1 comprises a horizontal heatable cylinder or barrel 1 which surrounds a rotary and reciprocable feed screw 2. The apparatus serves for plasticizing and melting of a synthetic plastic material prior to injection of plasticized material into the mold cavity or cavities of an injection molding machine, not shown.

The right-hand or rear end portion of the cylinder 1 is disposed at a level below a material feeding unit 3 having a funnel-shaped duct 4 which guides metered quantities of material (e.g., granulate) toward and into the inlet opening 11 of the cylinder. The feeding unit 3 further comprises a trough or chute 31 which is agitated by a suitable shaker 32 receiving motion from an electric motor or an electromagnet, not shown. The frequency of vibratory movements of the trough 31 can be regulated in a manner known per se, for example, through the medium of a potentiometer. The frequency depends on the nature and consistency of granulate and is selected in such a way that the inlet opening 11 is not clogged with material.

The cylinder 1 has a discharge end defined by a detachable head 5 for a reciprocable sealing pin 51 which receives motion from a drive 6 so that it can move between sealing and retracted positions. The foremost portion of the head 5 is formed with internal threads for the externally threaded portion of an injection nozzle 7 which receives plasticized material when the drive 6 maintains the sealing pin 51 in retracted position and the feed screw 2 moves axially.

The cylinder 1 is further formed with a composite venting or degasifying aperture 12 which extends radially upwardly and is disposed substantially midway between the ends of the cylinder.

The feed screw 2 comprises several sections including a rearmost section 29 which receives motion from a suitable prime mover, not shown, and an advancing section 21 which is located immediately ahead of the rearmost section 29. The core or shank of the section 21 or the feed screw 2 has a constant diameter, and the pitch of the thread which surrounds the core in the section 21 is also constant. The material which is admitted into the interior of the cylinder 1 via inlet opening 11 undergoes gradual compression during travel through the section 21 toward the orifice of the nozzle 7. Such material thereupon moves into the range of a first densifying section 22 wherein the diameter of the core of the feed screw increases, either all the way from the forward end of the section 21 to the forward end of the section 22 or in a manner as actually shown in the drawing, i.e., so that the rear part of the section 22 has a core portion of gradually increasing diameter and the front part of the section 22 has a core portion of constant diameter. The diameter of the core can increase again in the leftmost part of the section 22. The material which enters into and passes through the section 22 undergoes a very pronounced compression in several stages; such material thereupon passes through the narrow annular shearing gap 23 between the internal surface of the cylinder 1 and the periphery of a collar 28 which interrupts the thread of the feed screw 2 and whose diameter equals the maximum diameter of the core in the section 22. The material which passes through the gap 23 is subjected to maximum pressure (see the diagram of FIG. 2).

The gap 23 is followed by a pressure relaxing or reducing section 24 of the feed screw 2 wherein the pressure of conveyed material drops to atmospheric so that the material does not tend to escape via aperture 12 of the barrel 1. The inner diameter of the barrel 1 is assumed to be constant and the diameter of the core of the feed screw 2 in the section 24 is substantially less than the diameter of the core in the section 21. The depth of the groove defined by the thread of the core portion forming part of the section 24 exceeds the depth of groove defined by the core portion forming part of the section 21, e.g., by 10-20 percent, preferably by approximately 15 percent. The aperture 12 communicates with that portion of the interior of the cylinder 1 which surrounds the rear third of the section 24 when the feed screw 2 is located in the front end position shown in FIG. 1. The extent of axial movement of the feed screw 2 between the front and rear end positions is such that the aperture 12 always surrounds the core portion of the section 24 regardless of the axial position of the feed screw.

The length of the section 24 preferably exceeds the length of the maximum stroke of the feed screw 2; most preferably, the length of section 23 is between 1.6-2 times the length of maximum stroke if the improved apparatus supplies plasticized material to the mold or molds of an injection molding machine. This invariably insures that the aperture 12 communicates with that portion of the interior of the cylinder 1 which surrounds the section 24, even if the feed screw 2 is moved to its rear end position.

The section 24 is followed by a second densifying or compressing section 25 wherein the diameter of the core of the feed screw increases gradually in a direction toward the nozzle 7. Finally, the section 25 is followed by a metering section 26 wherein the core of the feed screw has a constant diameter and which is located immediately behind the tip 27 of the feed screw.

The length of the section 24, as considered in the axial direction of the feed screw 2, is preferably between 5D and 6D wherein D is the inner diameter of the cylinder 1. Thus, if the maximum stroke of the feed screw 2 in a direction toward or away from the nozzle 7 equals 3D, the aperture 12 invariably communicates with the space which surrounds the section 24 in each and every axial position of the feed screw.

The axial length of the feed screw 2 is approximately 20D which is a small fraction of the axial length (25-35D) of feed screws in conventional apparatus. It will be readily appreciated that a relatively short feed screw exhibits many advantages, not only as regards the cost of manufacture and weight but also as concerns the overall length of the apparatus and other factors.

The inlet opening 11 of the cylinder 1 receives the lower or discharge end of the duct 4 with a certain amount of clearance. Such clearance constitutes an annular aerating opening 41 which allows for preliminary degasification in the region of admission of granulate. This, in turn, reduces the likelihood of clumping of granulate due to adherence of neighboring granulae to each other.

An important advantage of the improved apparatus is that it can utilize a relatively simple feeding unit. All that is necessary is to design the feeding unit 3 in such a way that it can supply granular material at a rate which is required to prevent overfeeding of the cylinder 1 with granulae and to maintain friction in the first densifying section 22 in order to achieve a rather pronounced densification of conveyed material. As the material advances through and beyond the annular gap 23 between the internal surface of the cylinder 1 and the peripheral surface of the shearing collar 28, it enters the relatively large space which surrounds the section 24 whereby the pressure drops to atmospheric so that the material does not tend to rise into and escape via aperture 12. On the other hand, the feature that the material must pass through the narrow gap 23 between the cylinder 1 and the collar 28 insures that the volatile ingredients of the processed material are separated with a high degree of predictability and reliability and can issue from the cylinder by way of the aperture.

The provision of an adjustable feeding unit is desirable and advantageous because it contributes to versatility of the improved apparatus. Thus, by the simple expedient of adjusting the rate of feed, the improved apparatus can process granular synthetic plastic materials having a relatively high or a relatively low moisture content. Moreover, this renders it possible to use the apparatus for plasticizing of materials whose ability to attract moisture varies within a very wide range. Such materials include polycarbonates, methacrylates, acrylonitrile-butadiene-styrene plastics, butadiene-styrene, cellulose acetate, polyamides and others. All such materials can be processed by resorting to one and the same feed screw. The rate of feed can be varied to best suit the selected material and need not be automatic, as long as the ratio of the length of section 24 to the maximum stroke of the feed screw 2 and the position of the aperture 12 with respect to the section 24 is selected in a manner as outlined above. In spite of such versatility of the improved apparatus, the axial length of the feed screw can be reduced to a fraction of the length of feed screws is conventional apparatus wherein the feed screw comprises several sections including two densifying sections and a pressure relaxing section therebetween.

An apparatus with a heatable plasticizing cylinder and with a feed screw which is reciprocable in the cylinder during each working cycle is disclosed, for example, in British Pat. No. 849,645 to Windsor Ltd. German Pat. No. 1,779,488 to Reifenhauser KG discloses an adjustable feeding unit.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

What is claimed is:

1. Apparatus for the plasticizing and melting of synthetic plastic materials, particularly granular materials which, when plasticized, are introduced into the mold of an injection molding machine, comprising an elongated heatable cylinder having a constant inner diameter, an intake end provided with an inlet opening, a discharge end, and at least one gas-discharging aperture communicating with the surrounding atmosphere and disposed intermediate said opening and said discharge end; adjustable feeding means arranged to deliver metered quantities of granular material into said cylinder by way of said opening; and a feed screw rotatably mounted in said cylinder and including a material advancing section disposed in the region of said opening and having a first helical thread, a first material densifying section between said advancing section and said aperture, a pressure relaxing section disposed in the region of said aperture and having a second helical thread defining a groove of a depth exceeding the depth of the groove defined by said first thread by up to 20 percent, a second material densifying section between said pressure relaxing section and said discharge end, and a collar which is free of threads and is disposed between said first densifying section and said pressure relaxing section, said cylinder having an internal surface defining with said collar an annular shearing gap through which densified material passes from the cylinder portion surrounding said first densifying section into the cylinder portion surrounding said pressure relaxing section, said feed screw being cyclically movable axially of said cylinder between front and rear end positions through a distance which at most equals approximately 3D wherein D is the inner diameter of said cylinder and said aperture being provided in that portion of said cylinder which surrounds the rear third of said pressure relaxing section in the front end position of said feed screw, the axial length of said pressure relaxing section being between 1.6 and 2 times the extent of movement of said feed screw between said end positions thereof and between 5D and 6D.

2. Apparatus as defined in claim 1, wherein said feeding means comprises an agitator.

3. Apparatus as defined in claim 1, wherein the axial length of said feed screw is approximately 20D.